United States Patent
Ito et al.

(10) Patent No.: US 9,091,889 B2
(45) Date of Patent: Jul. 28, 2015

(54) LIQUID CRYSTAL DISPLAY DEVICE HAVING COLUMNAR SPACERS

(75) Inventors: Hideki Ito, Kanagawa (JP); Shinichi Nishida, Kanagawa (JP); Takahiko Watanabe, Kanagawa (JP); Atsushi Yamamoto, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 40 days.

(21) Appl. No.: 13/288,052

(22) Filed: Nov. 3, 2011

(65) Prior Publication Data

US 2012/0133853 A1    May 31, 2012

(30) Foreign Application Priority Data

Nov. 25, 2010   (JP) ................................. 2010-262791

(51) Int. Cl.
 *G02F 1/1339*    (2006.01)
 *G02F 1/1362*    (2006.01)
(52) U.S. Cl.
 CPC ...... *G02F 1/13394* (2013.01); *G02F 1/136213* (2013.01)
(58) Field of Classification Search
 CPC .................. G02F 1/13394; G02F 1/136213
 USPC ................... 349/39, 115, 38, 155–157
 See application file for complete search history.

(56) References Cited

U.S. PATENT DOCUMENTS

| | | | |
|---|---|---|---|
| 5,973,763 A * | 10/1999 | Fujimura et al. | 349/156 |
| 6,151,092 A | 11/2000 | Fujimura et al. | |
| 7,133,108 B2 | 11/2006 | Shimizu et al. | |
| 7,202,498 B2 | 4/2007 | Kim | |
| 7,456,926 B2 | 11/2008 | Shimizu et al. | |
| 7,632,692 B2 | 12/2009 | Kim | |
| 7,773,190 B2 | 8/2010 | Kwak et al. | |
| 7,826,028 B2 | 11/2010 | Shimizu et al. | |
| 8,081,286 B2 | 12/2011 | Kim et al. | |
| 2007/0002263 A1 * | 1/2007 | Kim et al. | 349/156 |
| 2008/0106659 A1 * | 5/2008 | Lai | 349/38 |

(Continued)

FOREIGN PATENT DOCUMENTS

| | | |
|---|---|---|
| CN | 1540426 | 10/2004 |
| CN | 1690790 | 11/2005 |

(Continued)

OTHER PUBLICATIONS

Japanese Office Action dated Apr. 15, 2014 in corresponding Japanese Patent Application No. 2010-262791 with English translation of enclosed lined portions.

(Continued)

*Primary Examiner* — Richard Kim
*Assistant Examiner* — Kendrick Hsu
(74) *Attorney, Agent, or Firm* — Young & Thompson

(57) ABSTRACT

To provide a structure of an electrically stable step film of a columnar spacer, which can be formed in a region of a storage capacitor without increasing the number of steps. A liquid crystal display device of the present invention further includes, in all the pixels, step films of a same area formed with a semiconductor layer within a storage capacitor forming part. The pixels includes a kind in which the columnar spacer is provided at a position abutting against a step film forming part and a kind in which the columnar spacer is provided at a position away from the step film forming part.

16 Claims, 11 Drawing Sheets

(56) References Cited

U.S. PATENT DOCUMENTS

2009/0316061 A1* 12/2009 Kao ................................ 349/38
2010/0103364 A1* 4/2010 Choi et al. .................... 349/157

FOREIGN PATENT DOCUMENTS

| CN | 1892346 | 1/2007 |
|----|---------|--------|
| CN | 1892382 | 1/2007 |
| CN | 101344685 | 1/2009 |
| JP | 10-268357 | 10/1998 |
| JP | 11-237635 | 8/1999 |
| JP | 2002-182220 | 6/2002 |
| JP | 3658766 | 6/2005 |
| JP | 2005-338770 | 12/2005 |
| JP | 2007-011272 | 1/2007 |

OTHER PUBLICATIONS

Chinese Office Action, dated Jan. 23, 2015, in corresponding Chinese Patent Application No. 201110391234.X.

* cited by examiner

LIQUID CRYSTAL DISPLAY DEVICE HAVING COLUMNAR SPACERS

CROSS-REFERENCE TO RELATED APPLICATION

This application is based upon and claims the benefit of priority from Japanese patent application No. 2010-262791, filed on Nov. 25, 2010, the disclosure of which is incorporated herein in its entirety by reference.

BACKGROUND OF THE INVENTION

1. Field of the Invention

The present invention relates to a liquid crystal display device which includes: a first and a second substrates; columnar spacers for keeping the gap therebetween; and a liquid crystal material filled in the gap.

2. Description of the Related Art

In the liquid crystal display device, spacers are inserted between two substrates in order to uniformanize the thickness of a liquid crystal layer between the two substrates. The columnar spacer is a spacer of a columnar shape provided to either one of the two substrates, and the tip comes to abut against the opposing substrate to keep the specific gap between the two substrates. When the columnar area density determined according to a product of the number of the columnar spacers per unit area and the area of the single columnar spacer is decreased, a following issue occurs. Since the anti-load property between the two substrates becomes insufficient, a plastic deformation occurs in the columnar spacers of that part particularly when a strong force is applied locally. As a result, the shape of the columnar spacers such as the height thereof becomes changed, so that the local gap unevenness is generated and may look as a display unevenness in some cases.

In the meantime, elastic deformation of a prescribed amount is applied in advance to the columnar spacers. The reason for this is to prevent the columnar spacers from becoming detached from the opposing substrate when the volume of the liquid crystal is expanded in accordance with an increase in the temperature. When the columnar area density is increased in such state, a frictional force between the columnar spacers and the substrate generated due to the elastic deformation is increased. Thus, even when there is a shifting stress (a force to shift the two substrates in parallel to each other) is generated between the two substrates, there is no shift generated therebetween due to the friction force. As a result, distortion is accumulated within the substrate (e.g., glass substrate), and the black display becomes nonuniform due to the elastic optical effect caused by the distortion.

In order to ease the trade-off mentioned above, there is proposed a technique which disposes pixels each having a step film on the substrate side opposing to the columnar spacers and pixels not having the step film on the substrate side opposing to the columnar spacers on a display panel (see Japanese Unexamined Patent Publication 2005-338770 (Patent Document 1), for example). For the pixel having the step film, elastic deformation of a prescribed amount is applied in advance to the columnar spacer (i.e., the tip of the columnar spacer is brought to abut relatively hard against the step film forming part), so that the elastic deformation can be maintained even when the volume of the liquid crystal is expanded due to an increase in the temperature. In the meantime, for the pixel having no step film, almost no elastic deformation is applied to the columnar spacer (i.e., a gap is provided between the tip of the columnar spacer and the opposing substrate, or, the tip of the columnar spacer is brought to abut relatively lightly against the opposing substrate), so that the tip of the columnar spacer comes to abut relatively hard against the opposing substrate only when there is a strong force applied between both substrates to function to support the columnar spacer of the pixel that has the step film. Such columnar spacer of the pixel having no step film along with the peripheral structure thereof is called an auxiliary column structure.

Hereinafter, the technique depicted in Patent Document 1 will be described as a "related technique". FIGS. 10A and 10B show a pixel having a step film according to the related technique, and FIGS. 11A and 11B show a pixel having no step film according to the related technique.

According to the related technique, on a TFT (Thin Film Transistor) substrate 1201, a pixel 1001 having a step film 1100 as a step film forming part is formed on the TFT substrate 1201 side which opposes to a columnar spacer 1304 as shown in FIGS. 10A and 10B and a pixel 1002 having no step film is formed on the TFT substrate 1201 side opposing to a columnar spacer 1305 as shown in FIGS. 11A and 11B. The columnar spacers 1304 and 1305 are provided on a counter substrate 1202 to keep the gap between the TFT substrate 1201 and the counter substrate 1202. A liquid crystal 1500 is sealed between the TFT substrate 1201 and the counter substrate 1202 by a well-known method. Both of the columnar spacers 1304 and 1305 are fixed (formed) on the inner face of the counter substrate 1202, i.e., on a surface opposing to the TFT substrate 1201. Further, as shown in FIGS. 10A and 10B, the step film 1100 as a step film forming part is formed at a position corresponding to the columnar spacer 1304 on the inner face of the TFT substrate 1201. The tip of the columnar spacer 1304 abuts against the corresponding step film 1100 at all times. As shown in FIGS. 11A and 11B, there is a gap corresponding to the film thickness of the step film 1100 between the tip of the columnar spacer 1305 and a corresponding part in the TFT substrate 1201 in a normal state (i.e., in a state where an external force is not applied from the outside).

FIG. 10A is an enlarged plan view of the pixel 1001 in which the columnar spacer 1304 is formed. In the pixel 1001, provided are a scan line 1011, a common wiring 1012, an inorganic insulating film 1021, a transistor (amorphous silicon: a-Si) 1032, a signal line 1040, a pixel wiring 1044, a protection film 1045, a pixel electrode 1071, a common electrode 1072a, a shield common electrode 1072b, the step film 1100, a common-electrode contact hole 1101a, a pixel-electrode contact hole 1101b, and the columnar spacer 1304.

FIG. 10B is a cross-sectional view of a part including the columnar spacer 1304 of FIG. 10A. In FIG. 10B, on the inner surface (i.e., the top face in the drawing) of the TFT substrate 1201, provided are a scan line 1011a containing Al (aluminum) as a main component, for example, a scan line 1011b containing Cr (chrome) as a main component, for example, a common wiring 1012a containing Al as a main component, for example, a common electrode 1012b containing Cr as a main component, for example, an inorganic insulating film 1021, a protection film 1051, an organic film 1061, and the step film 1100 formed at a position corresponding to the columnar spacer 1304. The step film 1100 is constituted with a first Cr layer 1041, an Al layer 1042, and a second Cr layer 1043 formed in order on a lowermost a-Si layer (step film) 1031.

In the meantime, on the inner surface of the counter substrate 1202 (i.e., the bottom face in the drawing), a black matrix 1301 having a light-shielding function, a color layer 1302, and a protection layer 1303 are formed, and the columnar spacer 1304 of a prescribed height is formed and attached on the protection layer 1303. Further, the liquid crystal layer 1500 is sandwiched or inserted (sealed) between the TFT substrate 1201 and the counter substrate 1202.

FIG. 11A and FIG. 11B are fragmentary enlarged views of the pixel 1002 corresponding to the columnar spacer 1305, and FIG. 11A is a plan view while FIG. 11B is a cross-sectional view of a part containing the columnar spacer 1305 of FIG. 11A. FIG. 11A is similar to FIG. 10A, except that the step film 1100 is not formed in FIG. 11A. Further, FIG. 11B is similar to FIG. 10B, except that the columnar spacer 1305 is formed instead of the columnar spacer 1304 of FIG. 10B and that the step film 1100 is not formed in the TFT substrate 1201 at the position corresponding to the columnar spacer 1305. Therefore, the tip of the columnar spacer 1305 is isolated from the protection film 1051.

As described above, the columnar spacer 1304 shown in FIGS. 10A and 10B is a columnar spacer which abuts against the step film 1100 formed on the opposing TFT substrate 1201 side at all times. In the meantime, the columnar spacer 1305 shown in FIGS. 11A and 11B is a columnar spacer which abuts against the TFT substrate 1201 only when the gap between the TFT substrate 1201 and the counter substrate 1202 is narrowed, since there is no step film 1100 on the opposing TFT substrate 1201 side.

In FIGS. 11A and 11B, the step film 1100 is not formed in the part corresponding to the tip of the columnar spacer 1305. Therefore, there is a gap between the columnar spacer 1305 and the TFT substrate 1201. Only when an external force squashing the panel is applied, the columnar spacer 1305 comes in contact with the TFT substrate 1201 to keep the gap between the TFT substrate 1201 and the counter substrate 1202.

As shown in FIGS. 10A and 10B, with the related technique, the step film 1100 of the columnar spacer 1304 is formed on the scan line 1011a. In that case, a semiconductor layer is interposed between two metal layers which form the wiring to form two kinds of pixels with a part having the semiconductor layer (step film) and a part not having the semiconductor layer. In the pixel having the semiconductor layer, the columnar spacer abuts against the step film forming part to support the gap between both substrates. In the meantime, in the pixel not having the semiconductor layer, the columnar spacer does not abut against the opposing substrate but comes to become floated, and the columnar spacer abuts against the opposing substrate to function as an auxiliary column for easing the load only when a strong load is applied locally.

As described above, the auxiliary column in which one or more kinds of inorganic layers (Cr layer, Al layer, a-Si, etc.) are combined as the step film forming part is proposed in the related technique. In this related technique, the step film of the columnar spacer is formed in a region on the scan line where a storage capacitor is not formed. Further, it is presupposed that the step film is formed not for all the pixels but only for a part of the pixels.

With a liquid crystal display device, it is necessary to form wirings other than the wiring for forming the storage capacitor to be thin as much as possible in order to acquire a high numerical aperture. For example, when forming the storage capacitor on a common wiring for supplying a common potential, it is desirable in terms of the numerical aperture to form the scan line where no storage capacitor is formed to be thin as much as possible. When the step film is to be formed on the scan line under such condition, the step film becomes extremely smaller compared to the columnar spacer. Thus, it is not possible to support the columnar spacer stably.

Therefore, in order to satisfy the demand for acquiring the higher numerical aperture, the step film needs to be formed on the common wiring that is formed relatively thick for forming the storage capacitor. However, the storage capacitor formed on the common wiring occupies the most of the common wiring region, so that the step film needs to be formed in the storage capacitor part. In the meantime, when the step film is formed in the region other than the storage capacitor part, a special region is required. This results in deteriorating the numerical aperture.

Similarly, it is also necessary to form the common wiring to be thin as much as possible even when the storage capacitor is formed on the scan line. Thus, the step film needs to be formed in the storage capacitor part on the scan line.

As described, for pursuing the higher numerical aperture, it is desirable to form the step film in the storage capacitor part. When the step film is to be formed only for prescribed pixels as in the case of the related technique, the step film needs to be formed with a passivation insulating film formed on the second metal layer or with another inorganic film layer in a case where the step film is to be formed with an electrode that constitutes the storage capacitor. In the former case, it is necessary to eliminate the passivation film other than the step film, so that it is not possible to secure a sufficient area in the region where the storage capacitor is formed. Further, the electrode is exposed in a wide area, so that there is an issue generated in terms of the reliability. In the latter case, there is an increase in the number of steps.

It is therefore an exemplary object of the present invention to provide an electrically stable step film structure which can be formed in the region of the storage capacitor without increasing the number of steps.

SUMMARY OF THE INVENTION

In order to achieve the foregoing object, the liquid crystal display device according to an exemplary aspect of the invention is a liquid crystal display device which includes: a first substrate; a second substrate opposing to the first substrate; columnar spacers provided on the second substrate for keeping a specific gap with respect to the first substrate; a liquid crystal material filled in the gap; a first metal layer provided partially on the first substrate; an insulating film provided on the first substrate including the first metal layer; a semiconductor layer provided partially on the insulating film; a second metal layer provided on the insulating film including the semiconductor layer; a first wiring formed with the first metal layer; a second wiring formed with the second metal layer; pixels formed in each of a plurality of regions sectioned by the second wiring and the first wiring; and storage capacitors formed with the first metal layer, the insulating film, and the second metal layer, wherein the liquid crystal display device is characterized to further include step films formed with the semiconductor layer to have a same area in all the pixels in a forming part of the storage capacitors, and the plurality of pixels includes a kind in which the columnar spacer is provided at a position abutting against a forming part of the step film and a kind in which the columnar spacer is provided at a position away from the forming part of the step film.

The term "pixels" used in the present invention is a general term for the pixels including sub-pixels.

With the present invention, the step films of the same area are formed with the semiconductor layer for all the pixels regardless of the existence of the columnar spacers and the positions.

BRIEF DESCRIPTION OF THE DRAWINGS

FIG. 3 shows cross-sectional views for describing actions of a storage capacitor in a step film forming part according to the first exemplary embodiment, in which

DETAILED DESCRIPTION OF THE PREFERRED EMBODIMENTS

Figure 1A:
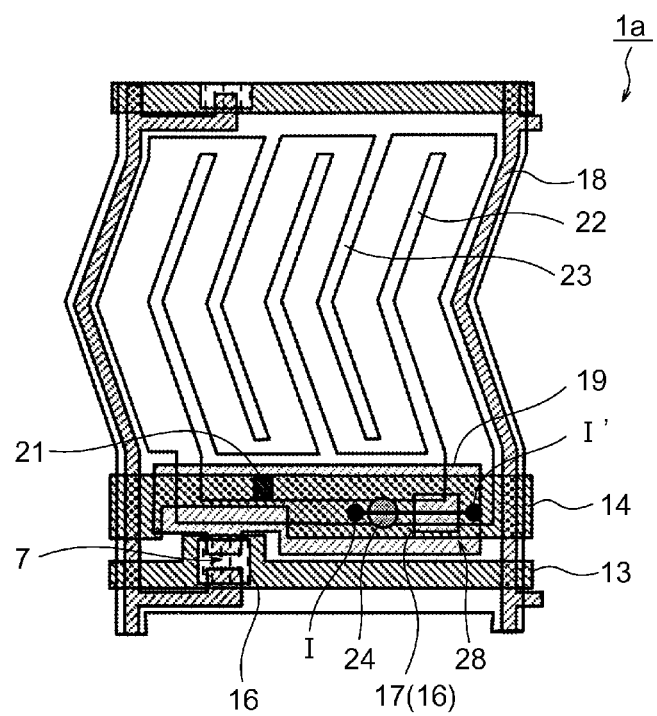
FIG. 1A is a plan view showing a pixel in which a columnar spacer and a step film according to a first exemplary embodiment are placed at different positions.

Hereinafter, modes for embodying the present invention (referred to as an "exemplary embodiment" hereinafter) will be described by referring to the accompanying drawings. In this Specification and the drawings, same reference numerals are applied to substantially the same structural components and the duplicated explanations are omitted.

First Exemplary Embodiment

Figure 1B:
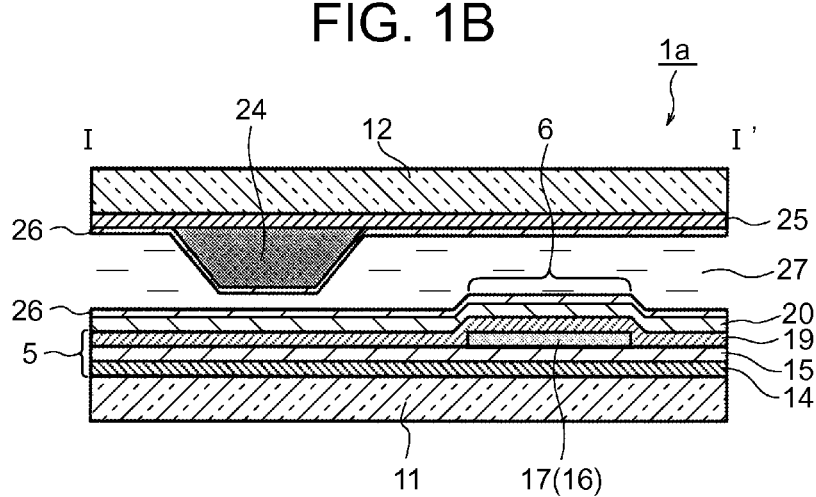
FIG. 1B is a cross-sectional view taken along a line I-I' of FIG. 1A.
Figure 2A:
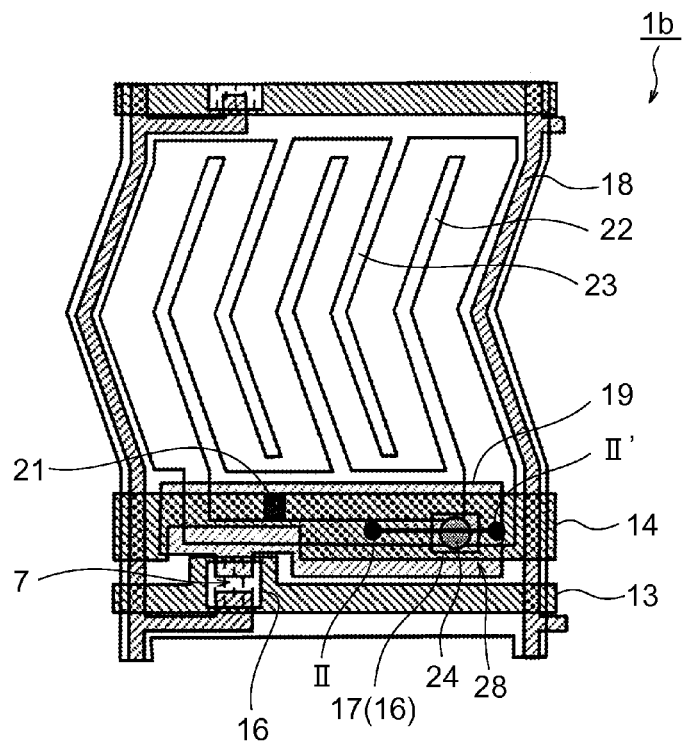
FIG. 2A is a plan view showing a pixel in which the columnar spacer and the step film according to the first exemplary embodiment are placed at a same position.
Figure 2B:
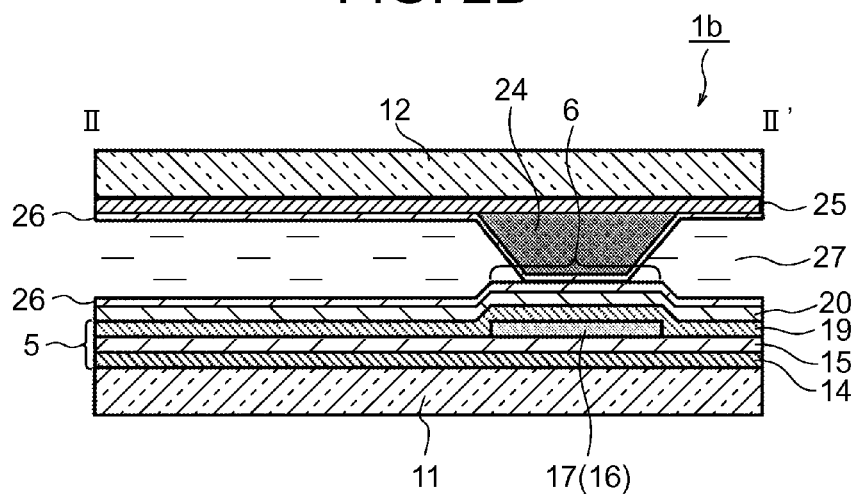
FIG. 2B is a cross-sectional view taken along a line II-II' of FIG. 2A.

FIG. 1A is a plan view showing a pixel in which a columnar spacer and a step film according to a first exemplary embodiment are placed at different positions, and FIG. 1B is a cross-sectional view taken along a line I-I' of FIG. 1A. FIG. 2A is a plan view showing a pixel in which the columnar spacer and the step film according to the first exemplary embodiment are placed at a same position, and FIG. 2B is a cross-sectional view taken along a line II-II' of FIG. 2A. Hereinafter, explanations are provided by referring to those drawings.

A liquid crystal display device according to the first exemplary embodiment includes: a first substrate (11); a second substrate (12) opposing to the first substrate (11); a columnar spacer 24 provided on the second substrate (12) for keeping a specific gap with respect to the first substrate (11); a liquid crystal material 27 filled in the gap; a first metal layer (13, 14) provided partially on the first substrate (11); an insulating film (15) provided on the first substrate (11) including the first metal layer (13, 14); a semiconductor layer 16 provided partially on the insulating film (15); a second metal layer (18, 19) provided on the insulating film (15) including the semiconductor layer 16; a first wiring (13, 14) formed by the first metal layer; a second wiring (18, 19) formed by the second metal layer; pixels 1a, 1b, - - - formed, respectively, in a plurality of regions sectioned by the second wiring (18, 19) and the first wiring (13, 14); and storage capacitors 28 formed by the first metal layer (13, 14), the insulating film (15), and the second metal layer (18, 19).

The liquid crystal display device according to the first exemplary embodiment further includes step films 17 of a same area formed by the semiconductor layer 16 within a storage capacitor forming part 5 in all the pixels 1a, 1b, - - -. The pixels 1a, 1b, - - - include the pixel 1b in which the columnar spacer 24 is provided at a position where the step film forming part 6 abuts against, and the pixel 1a in which the columnar spacer 24 is provided at a position away from the step film forming part 6.

According to the first exemplary embodiment, the electrically stable step film 17 can be provided in the storage capacitor forming part 5 through forming the step films 17 of the same area in all the pixels 1a, 1b, - - - with the semiconductor layer 16 regardless of the existence and position of the columnar spacers 24 without increasing the number of steps. Therefore, it is possible to acquire a display of a high numerical aperture and a high picture quality.

In the first exemplary embodiment, the first substrate is a TFT substrate 11, the second substrate is a counter substrate 12, the insulating film is a gate insulating film 15, the first wirings are a scan line 13 and a common wiring 14, the second wirings are a video signal wiring 18 and a source pixel electrode 19, a plurality of pixels 1a, 1b, - - - are sectioned by the scan line 13 and the video signal wiring 18, and the storage capacitor 28 is formed with the common wiring 14, the gate insulating film 15, and the source pixel electrode 19.

As shown in FIG. 1B and FIG. 2B, the storage capacitor forming part 5 is a region where the three layers of the common wiring 14, the gate insulating film 15, and the source pixel electrode 19 are superimposed, and it also includes the step film forming part 6. The step film forming part 6 is a region protruded towards the counter substrate 12 side because the step film 17 (semiconductor layer 16) is provided on the gate insulating film 15 within the storage capacitor forming part 5. The storage capacitor 28 is a capacitor provided in parallel to the liquid crystal elements of each of the pixels 1a, 1b, - - - for holding the signal voltage.

In other words, the liquid crystal display device according to the first exemplary embodiment is an active matrix type that includes the TFT substrate 11 and the counter substrate 12, in which: a specific gap is maintained with respect to the TFT substrate 11 by the columnar spacer 24 provided on the counter substrate 12; a liquid crystal material 27 is sandwiched in the gap; the scan line 13 and the common wiring 14 constituted with the first metal layer are placed on the TFT substrate 11; the gate insulating film 15 is formed thereon; the semiconductor layer 16 is placed thereon; the video signal wiring 18 and the source pixel electrode 19 constituted with the second metal layer are placed thereon; the pixels 1a, 1b, - - - are formed, respectively, in a plurality of regions sectioned by the scan line 13 and the video signal line 18; a TFT 7 using the semiconductor layer 16 is formed in the pixels 1a, 1b, - - - as a switch; and the storage capacitor 28 is formed with the source pixel electrode 19, the common wiring 14, and the gate insulating film 15. In the storage capacitor forming part 5, the step films 17 of a same area constituted with the semiconductor layer 16 connected to the source pixel electrode 19 are formed in all the pixels 1a, 1b, - - - between the source pixel electrode 19 and the common wiring 14. As the pixels 1a, 1b, - - - , there are the pixels 1b in which the columnar spacer 24 is provided at a position abutting against the step film forming part 6 provided and the pixels 1a in which the columnar spacer 24 is provided at a position away from the step film forming part 6.

The step film 17 of a same area formed with the semiconductor layer 16 exists in all the pixels 1a, 1b, - - - , so that the capacitance accompanying the step film 17 exhibits the same behavior in all the pixels 1a, 1b, - - -. Thus, the pixel potential change (referred to as a "feed-through voltage" hereinafter) generated in accordance with a potential change in the scan line 13 at the time of writing becomes equivalent in all the pixels 1a, 1b, - - - . Therefore, it is possible to form the electrically stable step films 17 efficiently. In the meantime, in the pixel 1b where the columnar spacer 24 abuts against the TFT substrate 11 in the step film forming part 6, the step film 17 is formed in such a manner that the columnar spacer 24 matches the step film 17. In the pixel 1a where the columnar spacer 24 is placed at a position different from that of the step film 17, the columnar spacer 24 exhibits almost no elastic deformation. Thus, the columnar spacer 24 functions as an auxiliary column. As a result, the electrically stable step film 17 can be formed in the storage capacitor forming part 5 without increasing the number of steps, so that it is possible to acquire a display of a high numerical aperture and a high quality.

Next, the structure of the first exemplary embodiment will be described in more details.

The storage capacitor 28 is formed by sandwiching the gate insulating film 15 between the source pixel electrode 19 and the common wiring 14 constituted with the first metal layer. In the storage capacitor forming part 5, the step film 17 formed with an a-Si layer as the semiconductor layer 16 is placed between the source pixel electrode 19 and the common wiring 14. The step film 17 is electrically connected to the source pixel electrode 19, and it is formed to have a same area and formed at a same position in all the pixels 1a, 1b, - - -.

As shown in FIG. 2A and FIG. 2B, in the pixel 1b where the columnar spacer 24 abuts against the TFT substrate 11 in the step film forming part 6, the TFT substrate 11 becomes high in the step film forming part 6 because of the step film 17. The columnar spacer 24 abuts against the step film forming part 6 to form a cell gap between the TFT substrate 11 and the counter substrate 12. The columnar spacer 24 in the pixel 1b is called a "main column".

In the meantime, as shown in FIGS. 1A and 1B, in the pixel 1a where the columnar spacer 24 is provided at a position away from the step film forming part 6, the columnar spacer 24 shown in FIG. 2B is away from the TFT substrate 11 for the height of the step film 17 unlike the case of the pixel 1b where the columnar spacer 24 abuts against the TFT substrate 11 in the step film forming part 6. The columnar spacer 24 in the pixel 1a is called an "auxiliary column".

Therefore, the columnar spacer 24 (the auxiliary column) does not function to support the gap between the TFT substrate 11 and the counter substrate 12 in a normal state, and only the columnar spacer 24 (the main column) functions to support the gap. However, when there is a large load applied locally, i.e., when the distance between the TFT substrate 11 and the counter substrate 12 becomes narrow and the columnar spacer 24 (the main column) is elastically deformed further, the columnar spacer 24 (the auxiliary column) abuts against the TFT substrate 11. Thereby, the columnar spacer 24 (the auxiliary column) functions not to cause a display unevenness that occurs due to having an uneven gap. This display unevenness is caused because the columnar spacer 24 (the main column) is excessively deformed to have plastic deformation, and the height of the columnar spacer 24 (the main column) changes locally.

The columnar spacer 24 according to the first exemplary embodiment is placed in all the blue pixels by using an acryl material. Among those, the pixel 1b in which the columnar spacer 24 is placed at the position abutting against the step film forming part 6 as shown in FIG. 2A is placed for 1/12 of the entire blue pixels, and the pixel 1a in which the columnar spacer 24 is placed at the position away from the step film forming part 6 as shown in FIG. 1A is placed for 11/12 of the entire blue pixels. The blue pixels having the columnar spacer 24 (the main column) and the blue pixels having the columnar spacer 24 (the auxiliary spacer) are placed uniformly within a plane with a ratio of 1:11. The abutting surface of the columnar spacer 24 is formed as a circular face of 12 μm in diameter when viewed from the above of the column.

The step film 17 is formed with an a-Si layer as the semiconductor layer 16. In the first exemplary embodiment, the film thickness of the a-Si layer is 200 nm. The step film 17 is formed to be slightly larger than the abutting face of the columnar spacer 24, and it is a circular form of 13 μm in diameter. The lower-layer source pixel electrode 19 and the upper-layer pixel electrode 22 are electrically connected via a contact hole 21. The common wiring 14 and the common electrode 23 are also electrically connected.

Next, a manufacturing method of the first exemplary embodiment will be described.

First, the first metal layer constituted with an aluminum alloy and a molybdenum is deposited in a thickness of 300 nm by sputtering on a glass substrate that is to be the TFT substrate 11, and it is processed to a pattern of the scan line 13 and a pattern of the common wiring 14.

Subsequently, as the gate insulating film 15, after depositing a silicon oxide of 100 nm, a silicon nitride of 300 nm, i-a-Si (intrinsic amorphous Silicon) of 170 nm, and n-a-Si (n-type amorphous Silicon) of 30 nm are successively deposited by a PCVD (Plasma Chemical Vapor Deposition) method. A stacked-layer film of i-a-Si and n-a-Si is eliminated by etching by leaving the part to be the semiconductor layer 16 of the TFT 7 as a pixel switch and the part to be the semiconductor layer 16 of the step film 17.

Subsequently, as the second metal layer, a film in which three layers of a molybdenum alloy, an aluminum alloy, and a molybdenum alloy is deposited in 300 nm, and it is processed to patterns of the video signal wiring 18, the drain electrode (a part of the video signal wiring 18), the source electrode (a part of the source pixel electrode 19), and the source pixel electrode 19. The step film 17 formed with the semiconductor layer 16 is formed to be covered by the source pixel electrode 19 that is formed with the second metal layer. Thereby, the step film 17 is connected to the source pixel electrode 19. Further, through the above-described step, the film thickness of the step film 17 becomes 200 nm that is the total thickness of i-a-Si and n-a-Si. The TFT 7 is constituted with the gate electrode (a part of the scanning lime 13), the gate insulating film 15, the semiconductor layer 16, the drain electrode (a part of the video signal wiring 18), and the source electrode (a part of the source pixel electrode 19).

Subsequently, an unnecessary part of the n-a-Si layer of the semiconductor layer 16 of the TFT 7 is etched by having the second metal layer as the mask. At this time, the semiconductor layer 16 to be the step film 17 is not etched because it is covered by the second metal layer. Subsequently, a silicon oxide of 300 nm is deposited as a passivation film 20.

Subsequently, the contact hole 21 of the pixel is formed, and a part of the passivation film 20 and a part of the gate insulating film 15 necessary to expose the metal layer in the terminal parts of the scan line 13, the video signal wiring 18, and the common wiring 14 drawn out in the periphery are eliminated by etching.

Subsequently, in the part where the video signal wiring 18 is formed, an interlayer film (not shown) made with a novolac resin is formed in a thickness of 800 nm on the passivation film 20 by being expanded for 2 μm each on both sides with respect to the video signal wiring 18.

Subsequently, the common electrode 23 and the pixel electrode 22 are formed in parallel to each other in a form of comb-like electrodes by using a transparent conductive film such as ITO (Indium Tin Oxide).

An alignment film 26 is applied and calcined on the TFT substrate 11 formed in the manner described above. In the meantime, a black matrix 25 and a color filter (not shown) are formed on the counter substrate 12, the columnar spacer 24 is formed thereon, and an alignment film 26 is further applied and calcined thereon. Then, rubbing processing is applied on the alignment films 26 on the both substrates in a direction perpendicular to the extending direction of the scan line 13, the both substrates are laminated, the periphery thereof is fixed by a seal member, the liquid crystal material 27 is inserted therein, and the hole is sealed.

The liquid crystal cell gap is set to be 3.0 μm, and used is the liquid crystal material 27 of an refractive index anisotropy of $\Delta n=0.10$ and a dielectric constant anisotropy of $\Delta \in =10$. When inserting the liquid crystal material 27, a sufficient inserting time is used so that the liquid crystal material 27 is sufficiently inserted inside the cell. Further, the hole is sealed by applying a pressure so that the inside the liquid crystal cell comes to have a prescribed pressure.

A cross Nicole polarization plate is laminated on both sides of the liquid crystal display panel formed in the manner described above such that one of the polarization axes matches the rubbing direction of the liquid crystal. Further, a required driving driver is loaded in the periphery, and a backlight and a signal processing substrate are assembled in a proper form to fabricate an active matrix type liquid crystal display device. The screen size is 15 inches diagonally, and the number of pixels is set to be 1024 pixels×RGB laterally and 768 pixels longitudinally.

In the first exemplary embodiment, the storage capacitor 28 is formed between the source pixel electrode 19 and the common wiring 14. The potential of the common wiring 14 can be supplied stably compared to the other wirings formed with the first metal layer such as the scan line 13, so that a stable display can be acquired without being influenced by routing in the periphery. Therefore, the first exemplary embodiment can be applied even to a structure which can decrease the cost of the members of the liquid crystal modules, such as COG (Chip On Glass) or COF (Chip On Film). In the first exemplary embodiment, COF is employed to form the liquid crystal modules.

In a second exemplary embodiment described later, the storage capacitor 28 is formed between the scan line 13 and the source pixel electrode 19. In this case, when the capacitor load of the liquid crystal display panel is large as in a case where the display screen size is large or a case where there are a great number of pixels, block unevenness by each driver of the scan lines 13 may appear on a display due to delay or the like of signals which supply an off-voltage of the scan lines 13. Therefore, it is difficult to employ COF in such case.

In the liquid crystal display device according to the first exemplary embodiment, the number of columnar spacers 24 (the main columns) abutting against the TFT substrate 11 in the step film forming part 6 is set to be $1/12$ of the entire columnar spacers 24 so as to reduce the number of the columnar spacers 24 directly receiving the load at all times per unit area. Therefore, fraction between the columnar spacers 24 and the TFT substrate 11 can be reduced, so that distortion between the TFT substrate 11 and the counter substrate 12 generated when the liquid crystal panel is touched is not fixed in that state. This makes it possible to acquire a fine black display.

Further, in the first exemplary embodiment, the main column can keep the elastic deformation of about 0.2 μm at normal temperatures. Thus, even under a state where the liquid crystal panel is placed by being stood up at high temperatures (in a state where the display screen is placed vertically to the ground), it is possible to prevent an issue of having unevenness in the gap that is caused because the liquid crystal is drawn down by the gravity since the main columns are keeping the elastic deformation.

Further, the step film 17 required for distinguishably forming the pixel 1b of the main column and the pixel 1a of the auxiliary column can be formed at the place where the storage capacitor 28 is formed, so that the pixels can be designed with a high numerical aperture. Through providing the step film 17 in the storage capacitor forming part 5, it is possible to increase the numerical aperture of about 8% in a relative value.

In the first exemplary embodiment, the proportion of the main columns of the columnar spacers 24 out of the entire columns is set as $1/12$. However, it is desirable to set the proportion to be about $1/30$ to $1/5$, while the optimum value varies slightly depending on the parameters such as the material, the size, the height, and the like of the columnar spacers 24.

Further, while the columnar spacer 24 is placed in all the blue pixels in the first exemplary embodiment, the columnar spacer 24 can be placed only to the pixels of about $1/2$ to $1/4$ blue pixels. In that case, it is desirable to change the proportion of the main column and the auxiliary column and to increase the proportion of the main column accordingly. It is desirable to place the main columns in a proportion of about $1/30$ to $1/5$ of the entire blue pixels at last. Needless to say, it is possible to employ the present invention with the other ranges.

In the first exemplary embodiment, the liquid crystal display device is an IPS (In-Plane Switching) mode. In the IPS mode, liquid crystal molecules aligned homogeneously in the rubbing direction of the liquid crystal are twist-deformed within a plane by an electric field substantially in parallel to the substrate formed between the pixel electrode 22 and the common electrode 23 formed in a comb-like electrode form to control the transmission light amount for each pixel.

Figure 3A:
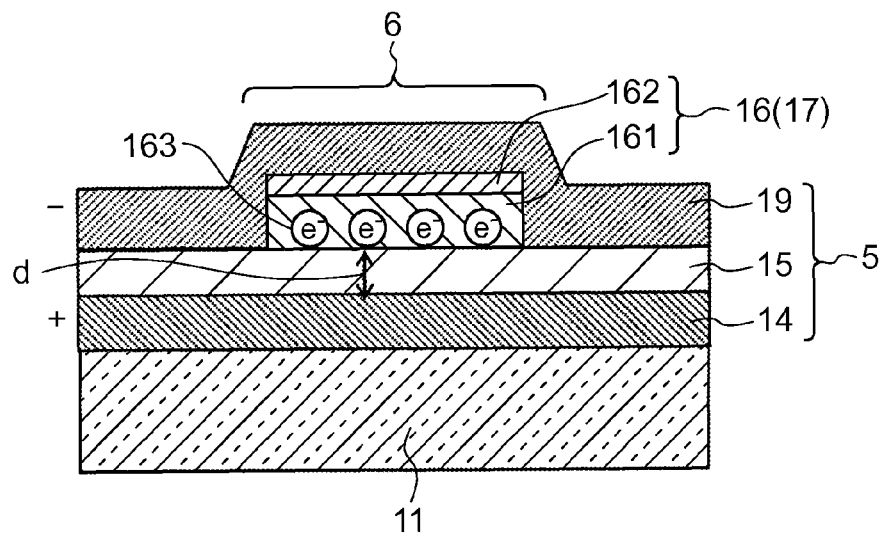
FIG. 3A is a case where an electrode constituted with a first metal layer is a positive potential for a source pixel electrode and FIG. 3B is a case where the electrode constituted with the first metal layer is a negative potential for the source pixel electrode.
Figure 3B:
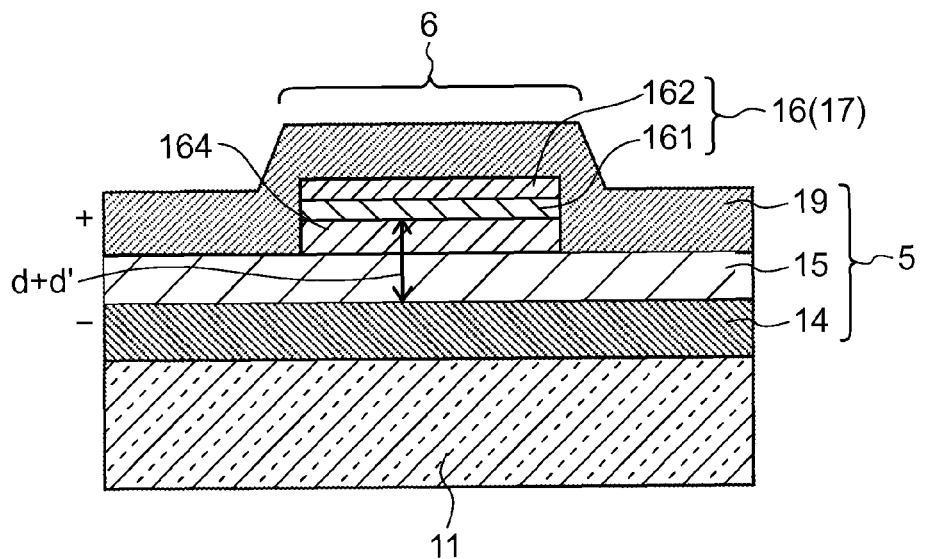

FIGS. 3A and 3B show cross-sectional views for describing actions of the storage capacitor in the step film forming part according to the first exemplary embodiment, in which FIG. 3A is a case where an electrode constituted with the first metal layer is a positive potential for the source pixel electrode and FIG. 3B is a case where the electrode constituted with the first metal layer is a negative potential for the source pixel electrode. Hereinafter, explanations are provided by referring to FIG. 1A to FIG. 3B.

For the actual driving, conducted is the so-called reversal drive which reverses the potential difference from the common potential to be positive and negative for each frame. The driving voltage at the time of white display is set to ±6 V. The capacitance value of the storage capacitor 28 becomes different depending on the potential difference between the pixel electrode 22 and the common wiring 14 due to the existence of the step film 17 formed with the semiconductor layer 16. FIG. 3 shows the relationship therebetween. The semiconductor layer 16 is constituted with two layers of an i-a-Si layer 161 and an n-a-Si layer 162.

For example, as shown in FIG. 3B, in a case where the source pixel electrode 19 keeps the positive-side potential of white display (positive frame), the potential of the common wiring 14 that is the counter electrode forming the storage capacitor 28, i.e., the common potential, becomes −6 V with respect to the potential of the source pixel electrode 19. In the meantime, as shown in FIG. 3A, in a case where the source pixel electrode 19 keeps the negative-side potential of white display (negative frame), the common potential becomes +6 V with respect to the potential of the source pixel electrode 19.

In a case of negative frame, the common wiring 14 opposing to the semiconductor layer 16 with the gate insulating film 15 interposed therebetween is biased to positive. Thus, an electronic accumulation layer 163 is generated in the interface of the i-a-Si layer 16 with respect to the gate insulating film 15. The capacitance value C− of the step film forming part 6 at that time can be expressed as follows, provided that the thickness of the gate insulating film 15 is d, the dielectric constant of the gate insulating film 15 is $\in$, and the area of the step film 17 is S.

$$C-=\in \cdot S/d$$

In the meantime, in a case of positive frame, the common wiring 14 is biased to negative inversely. Thus, a depletion layer 164 of a thickness of d' is generated in the interface of the i-a-Si layer 161 with respect to the gate insulating film 15. The capacitance value C+ of the step film forming part 6 at that time can be expressed as follows, provided that the dielectric constant of the i-a-Si layer is $\in'$.

$$C+=\in \cdot \in' \cdot S/(\in' \cdot d+\in \cdot d')$$

As described, comparing the capacitance value C− at the time of negative frame and the capacitance value C+ at the time of positive frame, the relationship between the both becomes "C+<C−". Thus, there is a difference generated between the both. Such capacitance change between positive and negative frames occurs not only in white display but also when displaying half tones.

In the first exemplary embodiment, the step films 17 of a same area are disposed in all the pixels 1a, 1b, - - - at a place where the storage capacitor 28 is formed. Thus, the capacitance change in the positive and negative frames becomes equal in all the pixels 1a, 1b, - - - , so that the feed-through voltage according to the potential fluctuation of the scan line 13 at the time of writing changes equally in all the pixels 1a, 1b, - - - . Therefore, through shifting the common potential or the pixel potential in all the pixels 1a, 1b, - - - for the amount of voltage according to the change thereof, such problem can be solved.

In the first exemplary embodiment, the IPS-mode liquid crystal display device is employed. However, the present invention can be employed to all kinds of active matrix type liquid crystal display devices having the pixel structure in which the storage capacitor 28 is formed between the second metal layer (e.g., the source pixel electrode 19) and the first metal layer without setting a specific limit to the liquid crystal drive mode.

Thus, as an exemplary advantage according to the invention, the electrically stable step films can be provided in the region where the storage capacitor is formed without increasing the number of steps. As a result, it becomes possible to acquire a display of a high numerical aperture and a high picture quality.

Second Exemplary Embodiment

Figure 4A:
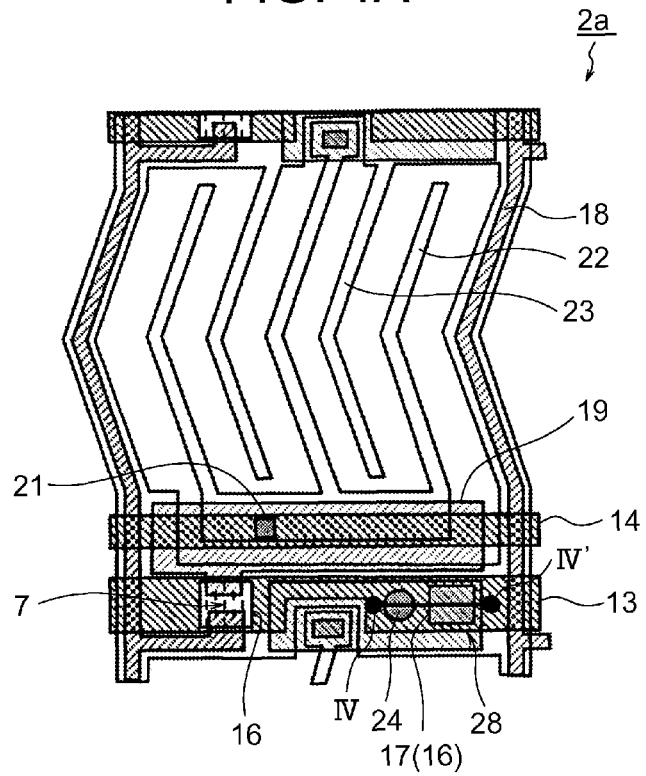
FIG. 4A is a plan view showing a pixel in which a columnar spacer and a step film according to a second exemplary embodiment are placed at different positions.
Figure 4B:
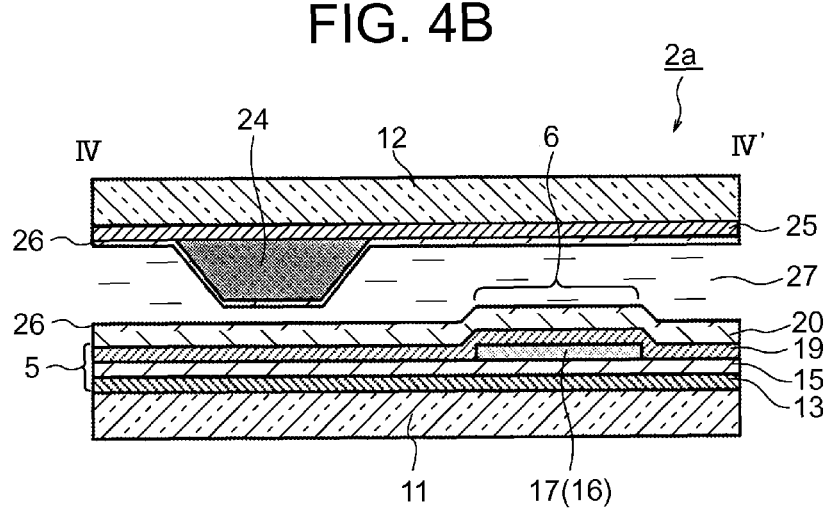
FIG. 4B is a cross-sectional view taken along a line IV-IV' of FIG. 4A.
Figure 5A:
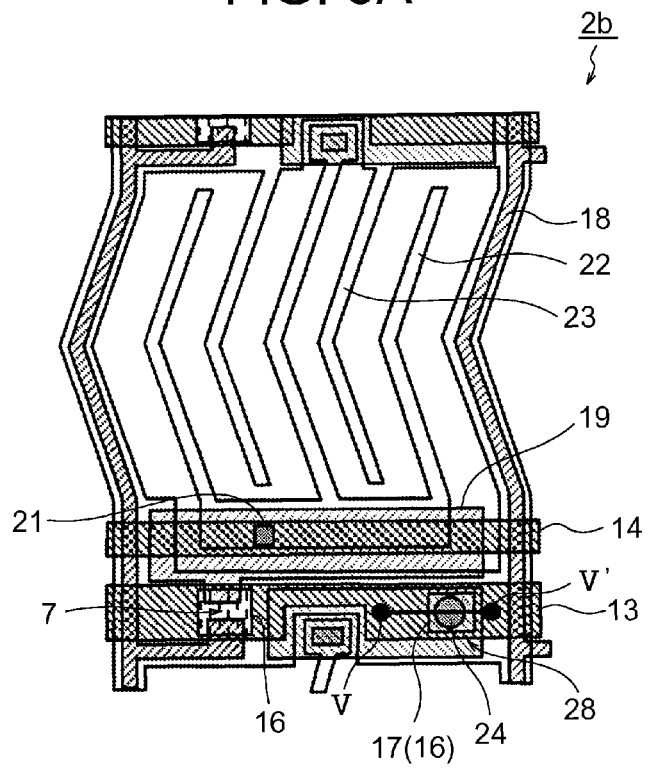
FIG. 5A is a plan view showing a pixel in which the columnar spacer and the step film according to the second exemplary embodiment are placed at a same position.
Figure 5B:
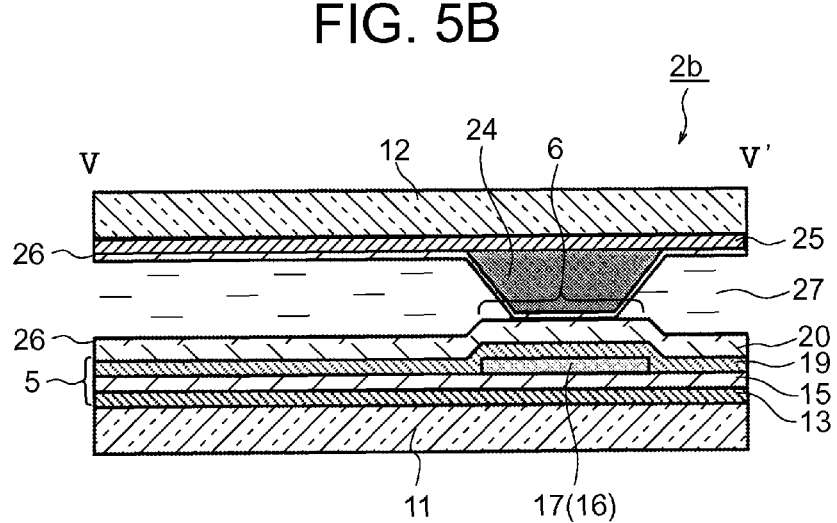
FIG. 5B is a cross-sectional view taken along a line V-V' of FIG. 5A.

FIG. 4A is a plan view showing a pixel in which a columnar spacer and a step film according to a second exemplary embodiment are placed at different positions, and FIG. 4B is a cross-sectional view taken along a line IV-IV' of FIG. 4A. FIG. 5A is a plan view showing a pixel in which a columnar spacer and a step film according to the second exemplary embodiment are placed at a same position, and FIG. 5B is a cross-sectional view taken along a line V-V' of FIG. 5A. Hereinafter, explanations are provided by referring to those drawings.

In the first exemplary embodiment, the storage capacitor 28 is formed between the source pixel electrode 19 and the common wiring 14 constituted with the first metal layer, and the step film 17 constituted with the semiconductor layer 16 is formed by being sandwiched between those. In the meantime, in the second exemplary embodiment, the storage capacitor 28 is formed between the source pixel electrode 19 and the scan line 13 constituted with the first metal layer. Other than that, the second exemplary embodiment is the same as the case of the first exemplary embodiment. In a pixel 2a shown in FIG. 4, the columnar spacer 24 and the step film 17 are disposed at different positions. In a pixel 2b shown in FIG. 5, the columnar spacer 24 and the step film 17 are disposed at a same position.

In the case of the first exemplary embodiment, the capacitance is changed by sandwiching the semiconductor layer 16 by the potential difference between the source pixel electrode 19 and the common wiring 14. In the meantime, in the case of the second exemplary embodiment, the capacitance is changed by sandwiching the semiconductor layer 16 by the potential difference between the source pixel electrode 19 and the scan line 13. A potential for turning off the TFT 7 is supplied to the scan line 13 in most of the time, and a potential for turning on the TFT is supplied only in a very short time during which the scan line 13 is selected. The off-voltage of the scan line 13 is set to a negative voltage in general, and it is set to be −8 V in the second exemplary embodiment. The on-potential of the scan line 13 is set to a positive voltage in general, and it is set to be 20 V in the second exemplary embodiment.

In a holding period, −8 V is applied to the scan line 13 at all times, so that the potential thereof becomes minus with respect to the potential of the source pixel electrode 19 at all times. However, in that case, the potential difference between the source pixel electrode 19 and the scan line 13 also varies in the positive frame and the negative frame. Thus, the step film 17 constituted with the semiconductor layer 16 formed to be sandwiched between the both electrodes of the storage capacitor 28 is formed to have a same area in all the pixels 2a, 2b, - - - . The other structures, the manufacturing method, the operations, and the like are the same as those of the first exemplary embodiment.

In the second exemplary embodiment, the storage capacitor 28 is formed between the source pixel electrode 19 and the scan line 13. That is, an electrode formed with the first metal layer that forms the storage capacitor 28 along with the source pixel electrode 19 is used as the scan line 13. Thereby, the width of the common wiring 14 can be reduced, so that the numerical aperture can be increased further. Through employing such pixel structure, it is possible to improve the transmittance by about 1% in a relative value compared to the case of the first exemplary embodiment.

In the meantime, when the capacitor load of the liquid crystal display panel is large as in a case where the display screen size is large or a case where there are a great number of pixels, block unevenness by each driver of the scan lines 13 may appear on a display due to delay or the like of signals which supply an off-voltage of the scan lines 13. In that case, it is difficult to employ COF. Therefore, the scan line driver is connected to the terminals by using TAB (Tape Automated Bonding).

Third Exemplary Embodiment

Figure 6A:
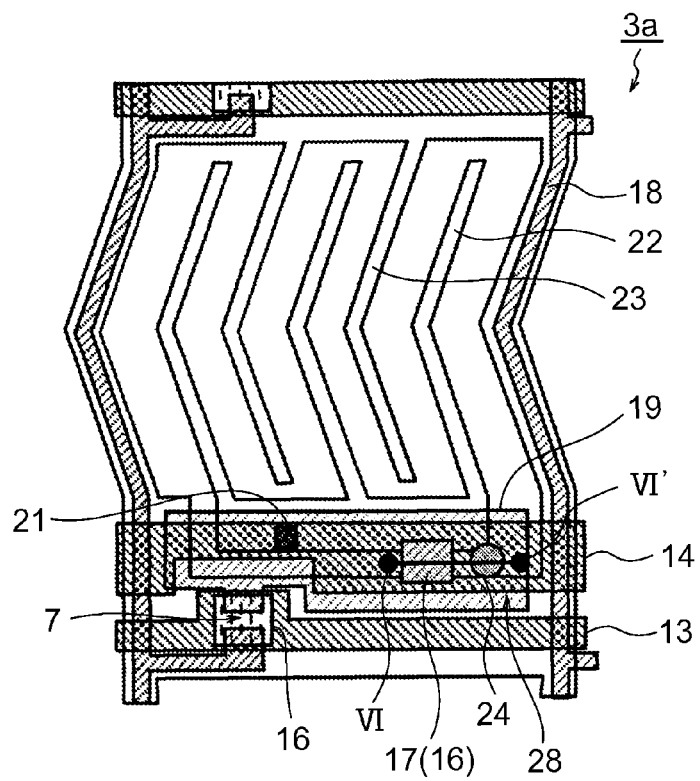
FIG. 6A is a plan view showing a pixel in which a columnar spacer and a step film according to a third exemplary embodiment are placed at different positions.
Figure 6B:
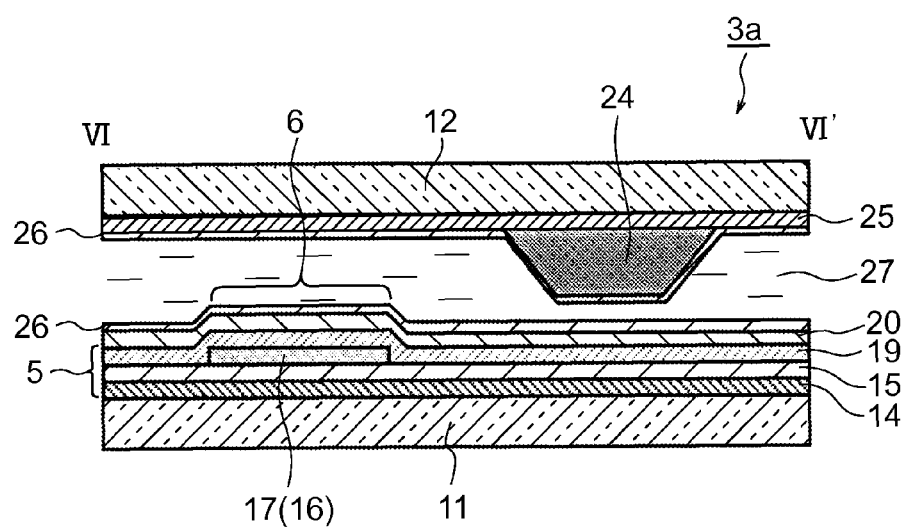
FIG. 6B is a cross-sectional view taken along a line VI-VI' of FIG. 6A.
Figure 7A:
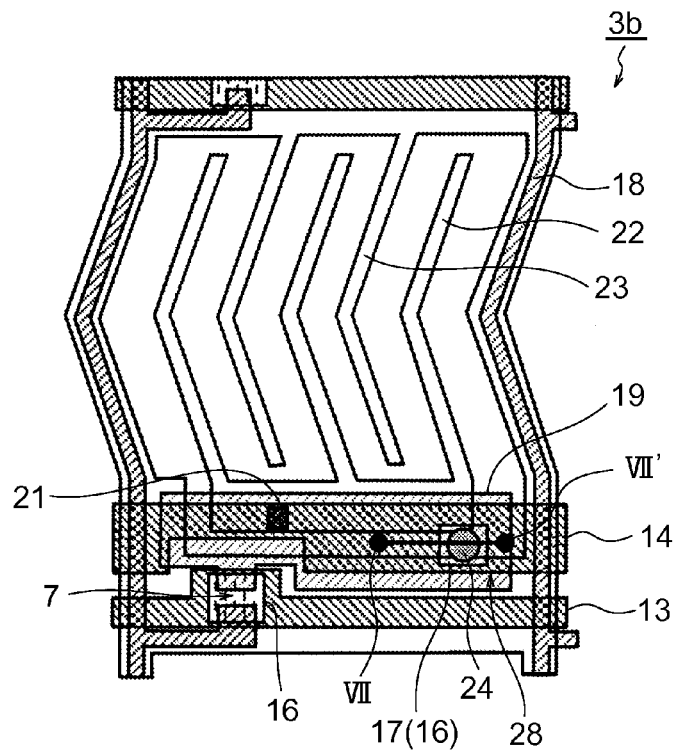
FIG. 7A is a plan view showing a pixel in which the columnar spacer and the step film according to the third exemplary embodiment are placed at a same position.
Figure 7B:
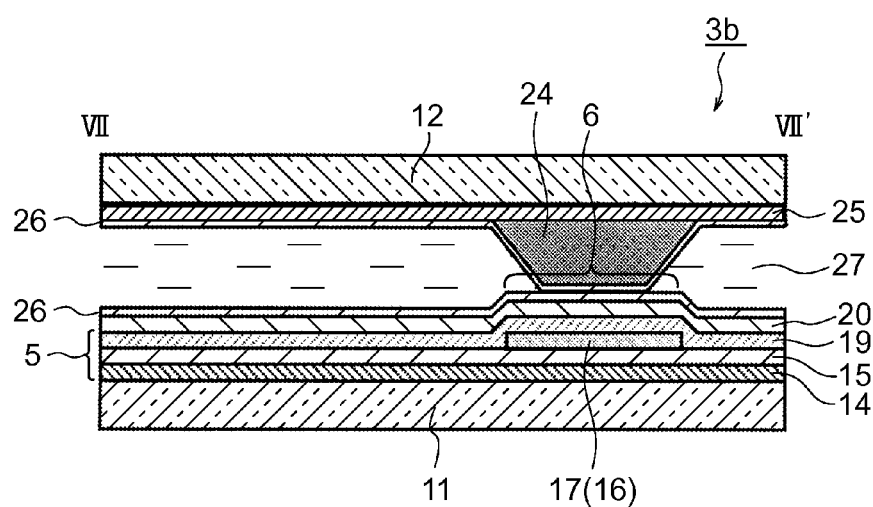
FIG. 7B is a cross-sectional view taken along a line VII-VII' of FIG. 7A.

FIG. 6A is a plan view showing a pixel in which a columnar spacer and a step film according to a third exemplary embodiment are placed at different positions, and FIG. 6B is a cross-sectional view taken along a line VI-VI' of FIG. 6A. FIG. 7A is a plan view showing a pixel in which the columnar spacer and the step film according to the third exemplary embodiment are placed at a same position, and FIG. 7B is a cross-sectional view taken along a line VII-VII' of FIG. 7A. Explanations will be provided hereinafter by referring to those drawings.

In the third exemplary embodiment, the storage capacitor 28 is formed between the source pixel electrode 19 and the common wiring 14 as in the case of the first exemplary embodiment. In the first exemplary embodiment, the step film 17 is formed to have a same area and at a same position in all the pixels 1a, 1b, - - -, and the position of the columnar spacer 24 is changed for the pixel 1a and for the pixel 1b to achieve the main column and the auxiliary column. In the meantime, in the third exemplary embodiment, the columnar spacer 24 is arranged at a same position in all the pixels 3a, 3b, - - -, and the position of the step film 17 is changed for the pixel 3a and for the pixel 3b to achieve the main column and the auxiliary column. That is, the columnar spacer 24 is arranged at a same position in all the blue pixels 3a, 3b, and the step film 17 is designed to have a same area in all the blue pixels 3a, 3b, - - -, but placed at different positions in the pixel 3b that forms the main column and in the pixel 3a that forms the auxiliary column. Thereby, the columnar spacer 24 in the pixel 3b having the main column abuts against the TFT substrate 11 in the step film forming part 6, and the columnar spacer 24 in the pixel 3a having the auxiliary column is formed at a position away from the step film forming part 6. In that case, the step films 17 can be arranged at an arbitrary position in red pixels and green pixels where no column is placed, as long as the step films 17 are formed to have a same area.

As described, through arranging the step films 17 of a same area in all the pixels 3a, 3b, - - -, the storage capacitors 28 exhibit the same behavior. In the third exemplary embodiment, the step films 17 are not arranged at the same positions unlike the case of the first exemplary embodiment. Thus, the columnar spacers 24 can be arranged at the same positions. This makes it possible to manufacture the columnar spacers 24 in uniform height and size, so that the uniformity of the gap can be easily secured. In the other aspects, the structures and the manufacturing method as well as the operations are the same as the case of the first exemplary embodiment.

In the third exemplary embodiment, the columnar spacers 24 formed on the counter substrate 12 are formed at the same position in all the blue pixels 3a, 3b, - - -. However, the columnar spacers 24 are not necessarily required to be formed at the same position, as long as those are formed at positions away from the step film forming part 6. It is also possible to change the positions of both the step films 17 and the columnar spacers 24 in the blue pixel 3b where main column is formed and the blue pixel 3a where the auxiliary column is formed. In such case, the columnar spacers 24 and the step films 17 may be placed efficiently in a narrower region particularly in a liquid crystal display device with a high definition.

Fourth Exemplary Embodiment

Figure 8A:
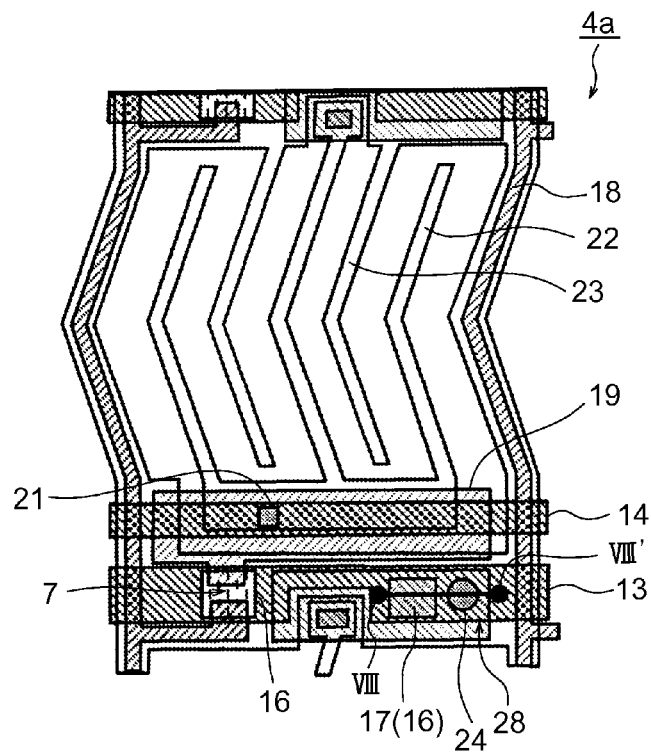
FIG. 8A is a plan view showing a pixel in which a columnar spacer and a step film according to a fourth exemplary embodiment are placed at different positions.
Figure 8B:
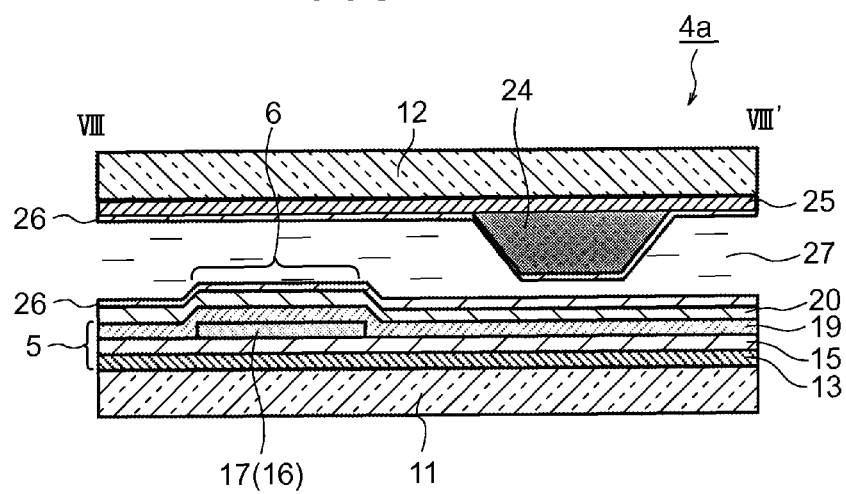
FIG. 8B is a cross-sectional view taken along a line VIII-VIII' of FIG. 8A.
Figure 9A:
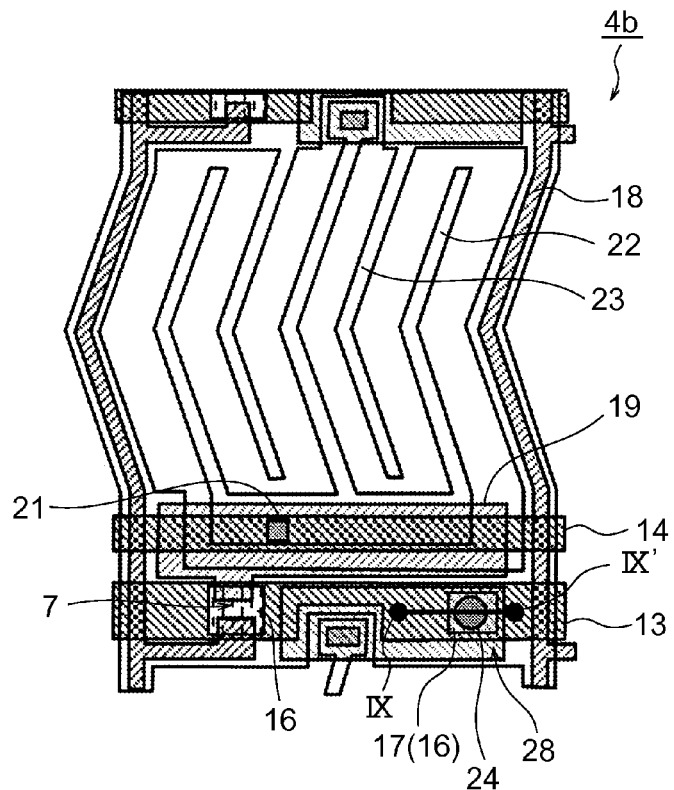
FIG. 9A is a plan view showing a pixel in which the columnar spacer and the step film according to the fourth exemplary embodiment are placed at a same position.
Figure 9B:
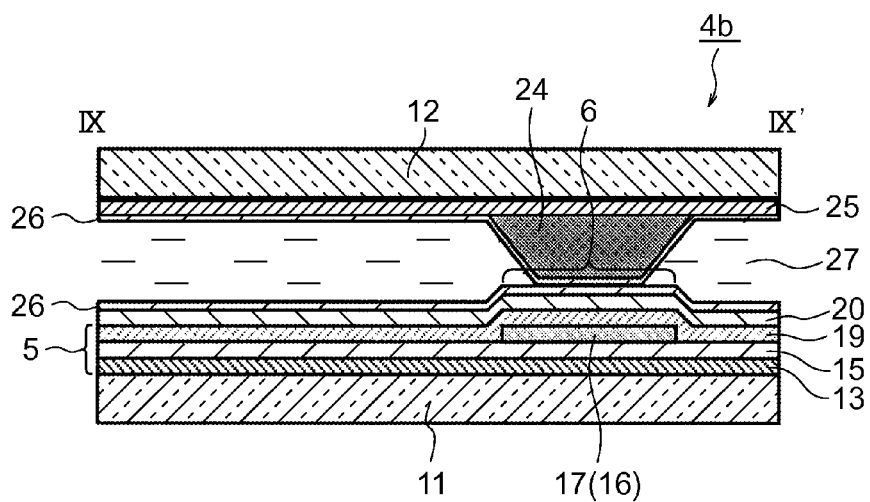
FIG. 9B is a cross-sectional view taken along a line IX-IX' of FIG. 9A.
Figure 10A:
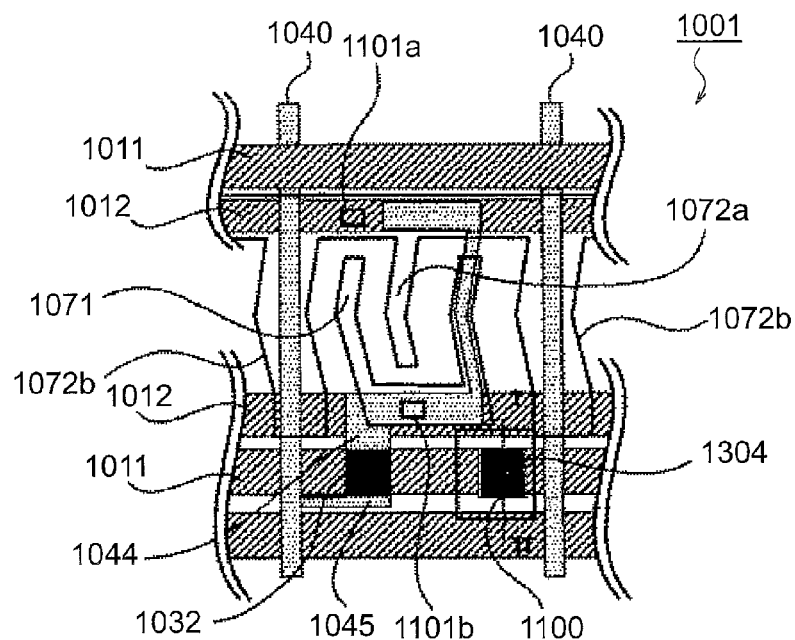
FIG. 10A is a plan view showing a pixel having a step film according to a related technique.
Figure 10B:
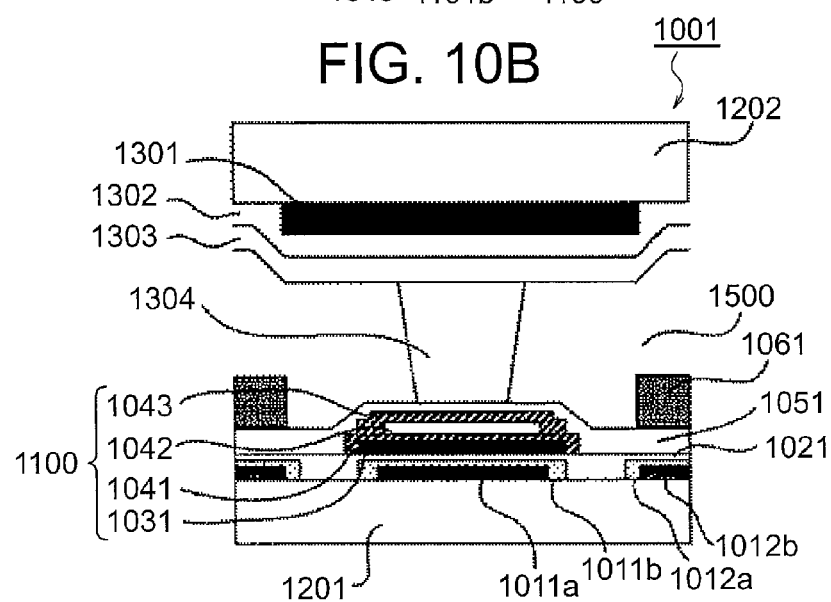
FIG. 10B is a fragmentary cross-sectional view of FIG. 10A.
Figure 11A:
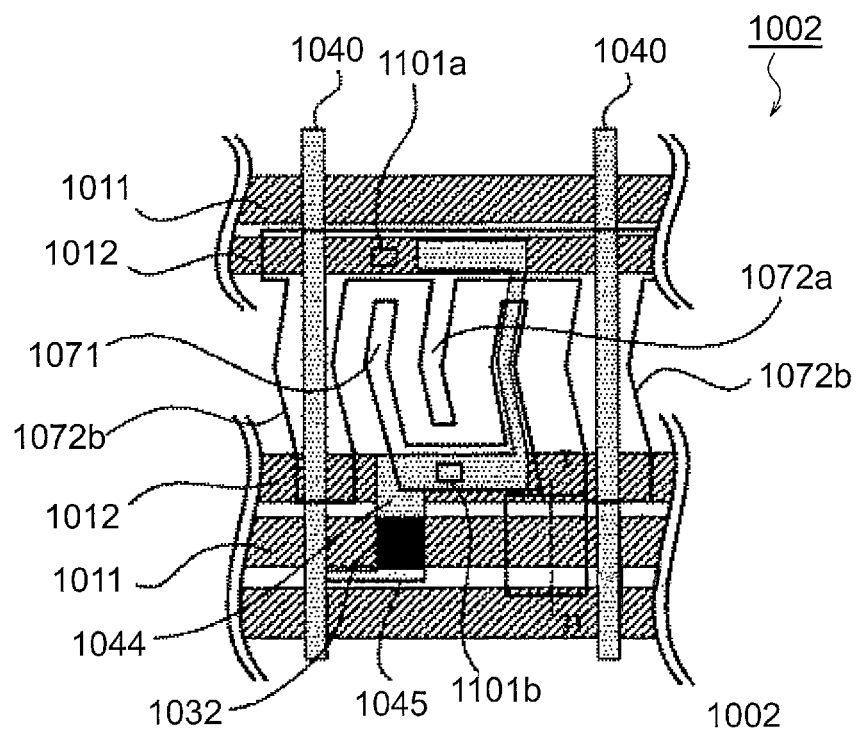
FIG. 11A is a plan view showing a pixel not having the step film according to the related technique.
Figure 11B:
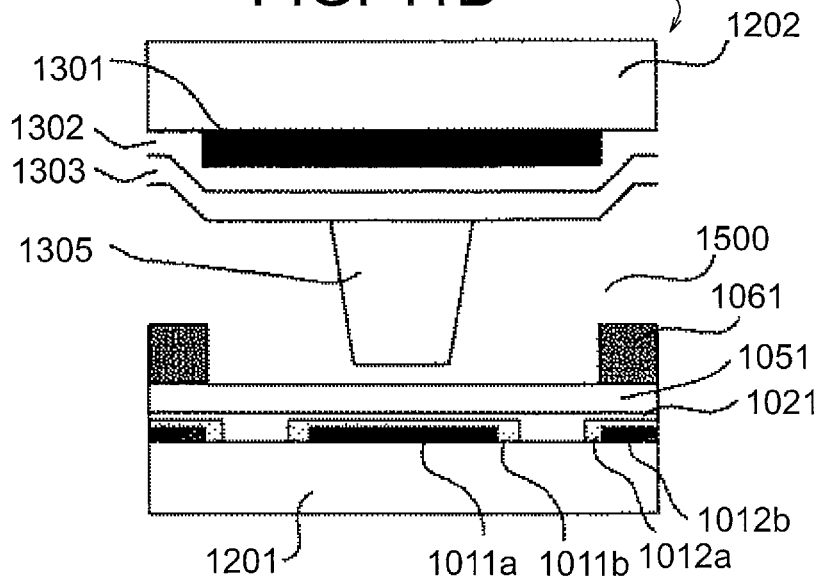
FIG. 11B is a fragmentary cross-sectional view of FIG. 11A.

FIG. 8A is a plan view showing a pixel in which a columnar spacer and a step film according to a fourth exemplary embodiment are placed at different positions, and FIG. 8B is a cross-sectional view taken along a line VIII-VIII' of FIG. 8A. FIG. 9A is a plan view showing a pixel in which the columnar spacer and the step film according to the fourth exemplary embodiment are placed at a same position, and FIG. 9B is a cross-sectional view taken along a line IX-IX' of FIG. 9A. Hereinafter, explanations will be provided by referring to those drawings.

In the fourth exemplary embodiment, the storage capacitor 28 is formed between the source pixel electrode 19 and the scan line 13 as in the case of the second exemplary embodiment. In the second exemplary embodiment, the step film 17 is formed to have a same area and at a same position in all the pixels 2a, 2b, - - -, and the position of the columnar spacer 24 is changed for the blue pixel 2b where main column is formed and the blue pixel 2a where the auxiliary column is formed. In the meantime, in the fourth exemplary embodiment, the columnar spacer 24 is arranged at a same position in all the blue pixels 4a, 4b, - - -, while the step films 17 are designed to have a same area in all the pixels 4a, 4b, - - - but the positions of the step films 17 are changed for the pixel 4b having the main column and for the pixel 4a having the auxiliary column. Thereby, the columnar spacer 24 in the pixel 4b having the main column abuts against the TFT substrate 11 in the step film forming part 6, and the columnar spacer 24 in the pixel 4a having the auxiliary column is formed at a position away from the step film forming part 6. In that case, the step films 17 can be arranged at arbitrary positions in red pixels and green pixels where no column is disposed, as long as the step films 17 are formed to have a same area.

In the other aspects, the structures and the manufacturing method as well as the operations are the same as the case of the second exemplary embodiment. While the columnar spacers 24 are placed at the same position in all the blue pixels 4a, 4b, - - -, the auxiliary columns are not necessarily required to be formed at the same position as long as those are placed at positions away from the step film forming part 6. If a more efficient layout can be achieved by changing the positions of the step films 17 and the positions of the columnar spacers 24 in a set for the blue pixels 4b having the main column and the blue pixels 4a having the auxiliary column, the positions of the both may be shifted in a set for each pixel.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

A part of or a whole part of the exemplary embodiments disclosed above can be expressed appropriately by the contents depicted in following Supplementary Notes. However, it is to be noted that the modes for carrying out the present invention and the technical spirit of the present invention are not limited to those contents.

(Supplementary Note 1)

An active matrix type liquid crystal display device which includes: a first and a second substrates exhibiting a transparent insulating characteristic; columnar spacers provided on the second substrate to keep a specific gap with respect to the first substrate; a liquid crystal material held in the gap; a scan line and a common wiring formed with a first metal layer provided on the first substrate; a gate insulating film provided thereon; a semiconductor layer provided thereon; a video signal wiring and a source pixel electrode formed with a second metal layer provided thereon; pixels formed in each of a plurality of regions sectioned by the scan line and the video signal wiring; TFT using the semiconductor layer formed in the pixels as a switch; and storage capacitors formed with the source pixel electrode, the electrode formed with the first metal layer, and the gate insulating film, wherein step films of a same area constituted with the semiconductor layer connected to the source pixel electrode are formed between a part of the source pixel electrode and the first metal layer in a forming part of the storage capacitor in all the pixels, and there are the pixels in which the columnar spacer is provided at a position abutting against a forming part of the step film and the pixels in which the columnar spacer is provided at a position away from the forming part of the step film.

The step films of a same area formed with the semiconductor layer exist in all the pixels, so that the capacitance accompanying the step films exhibits the same behavior in all the pixels. Thus, pixel potential change (the feed-through voltage) according to the potential fluctuation of the scan line at the time of writing becomes equal in all the pixels. Therefore, it is possible to form the electrically stable step films efficiently. In the meantime, in the pixel in which the columnar spacer abuts against the first substrate in the step film forming part, the columnar spacer is formed to match the step film. In the pixel in which the columnar spacer is arranged at a position different from the position of the step film, there is almost no elastic deformation generated in the columnar spacer. Thus, the columnar spacer functions as an auxiliary column. As a result, the electrically stable step films can be provided in the region where the storage capacitor is formed without increasing the number of steps. Therefore, it becomes possible to acquire a display of a high numerical aperture and a high picture quality.

(Supplementary Note 2)

The active matrix type liquid crystal display device as depicted in Supplementary Note 1, wherein the step films are formed at same positions in all the pixels.

Through forming the step films of the semiconductor layer in the same positions in all the pixels, uniformity of the writing holding actions in all the pixels becomes increased. Therefore, it is possible to acquire a more stable display.

(Supplementary Note 3)

The active matrix type liquid crystal display device as depicted in Supplementary Note 1, wherein the columnar spacers are formed at same positions in all the pixels where the columnar spacers are disposed.

Through forming the columnar spacers formed on the second substrate at the same positions in all the pixels in which the columnar spacers are disposed, the columnar spacers can be manufactured in uniform height and size. This provides an advantage of making it possible to secure the uniformity of the cell gap easily.

(Supplementary Note 4)

The active matrix type liquid crystal display device as depicted in any one of Supplementary Notes 1 to 3, wherein an electrode formed with the first metal layer that forms the source pixel electrode as well as the storage capacitor is the common wiring.

Through forming the electrode with the first metal layer that forms the source pixel electrode as well as the storage capacitor as the common wiring, the potential of the counter electrode that forms the storage capacitor becomes stable. Thus, it is not easily influenced by delay caused due to routing of the wiring in the periphery, etc., so that the cost of the liquid crystal modules such as COF and COG can be easily reduced.

(Supplementary Note 5)

The active matrix type liquid crystal display device as depicted in any one of Supplementary Notes 1 to 3, wherein an electrode formed with the first metal layer that forms the source pixel electrode as well as the storage capacitor is the scan line.

Through forming the electrode with the first metal layer that forms the source pixel electrode as well as the storage capacitor as the scan line, the width of the common wiring can be decreased. Therefore, it is possible to increase the numerical aperture further.

(Supplementary Note 6)

A liquid crystal display device which includes: a first substrate; a second substrate opposing to the first substrate; columnar spacers provided on the second substrate for keeping a specific gap with respect to the first substrate; a liquid crystal material filled in the gap; a first metal layer provided partially on the first substrate; an insulating film provided on the first substrate including the first metal layer; a semiconductor layer provided partially on the insulating film; a second metal layer provided on the insulating film including the semiconductor layer; a first wiring formed with the first metal layer; a second wiring formed with the second metal layer; pixels formed in each of a plurality of regions sectioned by the second wiring and the first wiring; and storage capacitors formed with the first metal layer, the insulating film, and the second metal layer, wherein the liquid crystal display device further includes step films formed with the semiconductor layer to have a same area in all the pixels in a forming part of the storage capacitors, and the plurality of pixels includes a kind in which the columnar spacer is provided at a position abutting against a forming part of the step film and a kind in which the columnar spacer is provided at a position away from the forming part of the step film.

(Supplementary Note 7)

The liquid crystal display device as depicted in Supplementary Note 6, wherein the step films are formed at same positions in all the pixels.

(Supplementary Note 8)

The liquid crystal display device as depicted in Supplementary Note 6, wherein the columnar spacers are formed at same positions in all the pixels where the columnar spacers are disposed.

(Supplementary Note 9)

The liquid crystal display device as depicted in any one of Supplementary Notes 6 to 8, wherein: the first substrate is a TFT substrate; the second substrate is a counter substrate; the insulating film is a gate insulating film; the first wiring is a scan line and a common wiring; the second wiring is a video signal wiring and a source pixel electrode; the plurality of pixels are sectioned by the scan line and the video signal wiring; and the storage capacitors are formed with the first metal layer, the gate insulating film, and the source pixel electrode.

(Supplementary Note 10)

The liquid crystal display device as depicted in Supplementary Note 9, wherein the first metal layer for forming the storage capacitor is the common wiring.

(Supplementary Note 11)

The liquid crystal display device as depicted in Supplementary Note 9, wherein the first metal layer for forming the storage capacitor is the scan line.

INDUSTRIAL APPLICABILITY

The present invention can be utilized for a liquid crystal display device which includes a first and a second substrates, columnar spacers for keeping the gap therebetween, and a liquid crystal material filled in the gap.

What is claimed is:

1. A liquid crystal display device, comprising:
a first substrate;
a second substrate opposing to the first substrate;
columnar spacers provided on the second substrate for keeping a specific gap with respect to the first substrate;
a liquid crystal material filled in the gap;
a first metal layer provided partially on the first substrate;
an insulating film provided on the first substrate and on the first metal layer;
a semiconductor layer provided partially on the insulating film;
a second metal layer provided on the insulating film and on the semiconductor layer;
a first wiring formed with the first metal layer;
a second wiring formed with the second metal layer;
sub-pixels formed in each of a plurality of regions sectioned by the second wirings neighboring to each other and the first wirings neighboring to each other, wherein plural of said sub-pixels define a pixel; and
storage capacitors formed with the first metal layer, the insulating film, and the second metal layer, wherein
each of the sub-pixels of the liquid crystal display device further comprise a step film formed with the semiconductor layer, each of the step films having a same area in all the sub-pixels in a forming part of the storage capacitor,
the plurality of sub-pixels includes a sub-pixel in which the step film is provided at a position where the columnar spacer abuts, and a sub-pixel in which the step film is provided at a position away from the columnar spacer, and
the columnar spacers are formed at same positions in the sub-pixels in which the columnar spacers are provided.

2. The liquid crystal display device as claimed in claim 1, wherein,
the first substrate is a TFT substrate;
the second substrate is a counter substrate;
the insulating film is a gate insulating film;
the first wiring is a scan line and a common wiring;
the second wiring is a video signal wiring and a source pixel electrode;
the plurality of sub-pixels are sectioned by the scan line and the video signal wiring; and
the storage capacitors are formed with the first metal layer, the gate insulating film, and the source pixel electrode.

3. The liquid crystal display device as claimed in claim 2, wherein,
the first metal layer for forming the storage capacitor is the common wiring.

4. The liquid crystal display device as claimed in claim 2, wherein,
the first metal layer for forming the storage capacitor is the scan line.

5. The liquid crystal display device as claimed in claim 2, wherein,
an area of an uppermost surface of the step film is larger than an area of a surface of the columnar spacer that abuts against the step film.

6. The liquid crystal display device as claimed in claim 5, wherein,
the uppermost surface of the step film abutting against the columnar spacer is flat.

7. The liquid crystal display device as claimed in claim 1, wherein,
an area of an uppermost surface of the step film is larger than an area of a surface of the columnar spacer that abuts against the step film.

8. The liquid crystal display device as claimed in claim 7, wherein,
the uppermost surface of the step film abutting against the columnar spacer is flat.

9. A liquid crystal display device, comprising:
a first substrate;
a second substrate opposing to the first substrate;
columnar spacers provided on the second substrate, wherein the columnar spacers keep a specific gap with respect to the first substrate;
a liquid crystal material filled in the gap;
a first metal layer provided partially on the first substrate;
an insulating film provided on the first substrate and provided on the first metal layer;
a semiconductor layer provided partially on the insulating film;
a second metal layer provided on the insulating film and provided on the semiconductor layer;
first wirings formed with the first metal layer and having a length running in a first direction;
second wirings formed with the second metal layer and having a length running in a second direction;
a plurality of regions sectioned by the first wirings neighboring each other and by the second wirings neighboring each other;
sub-pixels in each of the plurality of regions, wherein plural of said sub-pixels define a pixel; and
storage capacitors formed with the first metal layer, the insulating film, and the second metal layer,
wherein each of the sub-pixels of the liquid crystal display device further comprise a step film formed with the semiconductor layer and having a same area at a same position in all the sub-pixels in a forming part of the storage capacitor,
wherein each of the plurality of sub-pixels includes both one of the columnar spacers and one of the step films such that the plurality of sub-pixels includes i) first sub-pixels in which the columnar spacer is provided at a position where the step film abuts the columnar spacer, and ii) second sub-pixels in which the columnar spacer is provided at a position spaced away from the step film having no abutting columnar spacer.

10. The liquid crystal display device as claimed in claim 9, wherein,
   the first substrate is a TFT substrate;
   the second substrate is a counter substrate;
   the insulating film is a gate insulating film;
   the first wirings are a scan line and a common wiring;
   the second wirings are a video signal wiring and a source pixel electrode; and
   the storage capacitors are formed with the first metal layer, the gate insulating film, and the source pixel electrode.

11. The liquid crystal display device as claimed in claim 10, wherein,
   the first metal layer forming the storage capacitor is the common wiring.

12. The liquid crystal display device as claimed in claim 10, wherein,
   the first metal layer forming the storage capacitor is the scan line.

13. The liquid crystal display device as claimed in claim 10, wherein,
   an area of an uppermost surface of the step film is larger than an area of a surface of the columnar spacer that abuts against the step film.

14. The liquid crystal display device as claimed in claim 13, wherein,
   the uppermost surface of the step film abutting against the columnar spacer is flat.

15. The liquid crystal display device as claimed in claim 9, wherein,
   an area of an uppermost surface of the step film is larger than an area of a surface of the columnar spacer that abuts against the step film.

16. The liquid crystal display device as claimed in claim 15, wherein,
   the uppermost surface of the step film abutting against the columnar spacer is flat.

* * * * *